Figure 3:
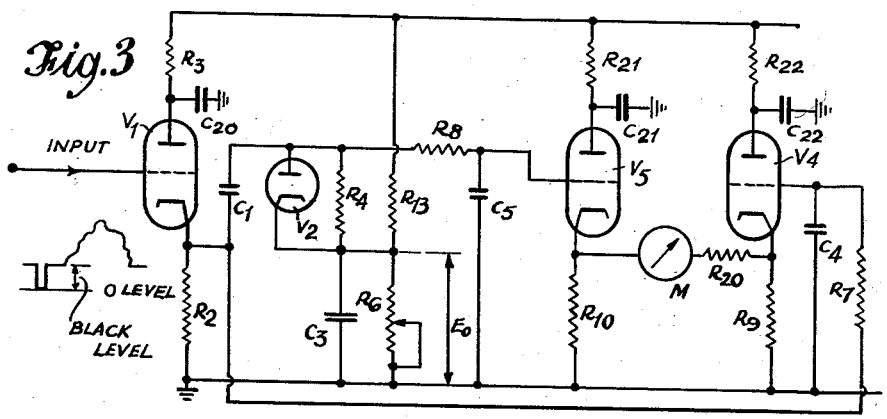

Nov. 9, 1954　　　　　L. LAX　　　　　2,694,181
PEAK-TO-PEAK VOLTMETER
Filed Dec. 15, 1949　　　　　　　　　　　　2 Sheets-Sheet 1
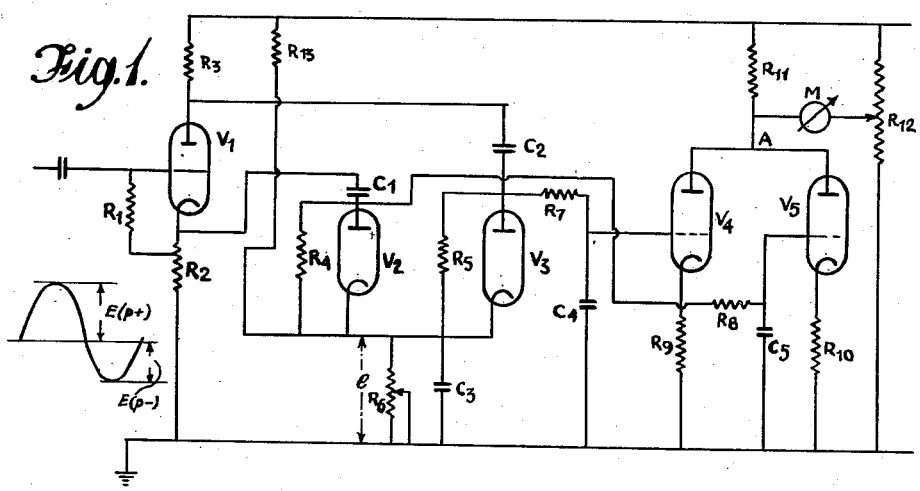
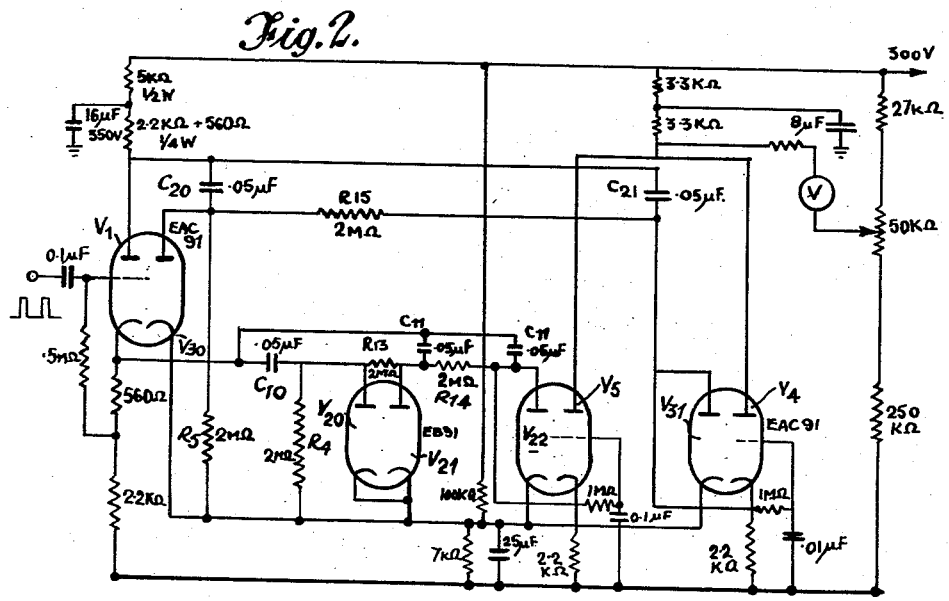
Inventor
*Ladislav Lax*
By *O'Boyle + Blair*
Attorneys Nov. 9, 1954

L. LAX 2,694,181

PEAK-TO-PEAK VOLTMETER

Filed Dec. 15, 1949

2 Sheets-Sheet 2

Inventor
Ladislav Lax

By O'Bayle + Blair
Attorneys

United States Patent Office 2,694,181
Patented Nov. 9, 1954

2,694,181

PEAK-TO-PEAK VOLTMETER

Ladislav Lax, Cambridge, England, assignor to Pye Limited, Cambridge, England, a British company Application December 15, 1949, Serial No. 133,095

Claims priority, application Great Britain December 17, 1948

10 Claims. (Cl. 324—103)

The present invention relates to a voltmeter for measuring the peak-to-peak voltage of an alternating or pulsating waveform.

According to the present invention, the waveform of which the peak-to-peak voltage is to be measured is fed to a phase splitting device, the two outputs from which are fed to a pair of devices for measuring the average-to-peak voltage of each wave, the outputs from said two devices being added together to give a reading of the peak-to-peak voltage.

The invention will be described with reference to the accompanying drawings which show three alternative circuit diagrams of arrangements according to the invention.

A circuit arrangement of a simple voltmeter according to the present invention is illustrated in Fig. 1. In Fig. 1, V1 is a phase splitting valve, to the input electrode of which is fed the waveform of which the peak-to-peak voltage is to be measured. If the resistances R2 and R3 are equal, the waveforms appearing across them are identical in shape and amplitude but opposite in phase. These waveforms are applied through condensers C1 and C2 to the anodes of two diodes or other rectifying devices V2 and V3 respectively, the cathodes of which are maintained at a potential $e$ by appropriate connection to the voltage dropping resistors R13 and R6 connected across the high tension supply. The resistor R6 is shunted by the condenser C3 and the diodes V2 and V3 have their anodes and cathodes connected by the resistors R4 and R5 respectively. The diodes thus act as D. C. restorers so that at the anodes of these diodes the positive peaks of the supply waveforms will be restored to the voltage $e$ by reason of the fact that due to the action of the diodes V2 and V3, negative D. C. components are added to the waveforms which are respectively equal to the positive peak voltages of the two waveforms reckoned from the average voltage. These D. C. components are applied through the smoothing networks R8, C5, R7, C4 respectively to the grids of two valves V5 and V4. As the condensers C4, C5 were originally charged to the voltage $e$ they acquire a voltage drop equal respectively to the negative D. C. components added to the waveforms, namely voltage drops of $E(p-)$ and $E(p+)$ respectively. The changes in the currents in the two valves V4 and V5 are proportional to the applied voltages (if the valves are identical and their cathode resistors R9 and R10 are equal). The resultant current in the resistor R11, and therefore the voltage change at the point A, is thus proportional to the sum of the two voltages $E(p+)+E(p-)$, that is the peak-to-peak voltage. This can be measured in any suitable manner, for example by means of the meter M connected between the point A and an appropriate point on the potentiometer R12.

The valves V4 and V5 need not be absolutely identical if $1/g$ is very much smaller than the value of R9 and R10, where $g$ is the mutual conductance of the valve.

Fig. 2 shows an improved circuit arrangement in which the single diodes V2 and V3 are replaced by three diodes V20, V21, V22, and two diodes V30, and V31 respectively, each of the anodes of which are connected to the input waveform through separate condensers C10, C11, C12 and C20 and C21, with the anodes interconnected together through resistors R12, R14 and R15. These resistors delay the decay time of the charges established on the anodes of the diodes so that the arrangement is suitable for measuring the peak-to-peak voltage of waveforms with very short peak pulses. In the arrangement described more diodes are used for measuring the peak voltage of one half of the wave than the other, since the circuit is intended for measuring peak-to-peak voltages of pulse waveform of which the positive peaks are of shorter duration than the negative peaks.

Fig. 3 shows a modified circuit which enables the peak voltage to be measured from any predetermined level as, for example, the peak white voltage from the black level in a television waveform.

The grid of V1 is D. C. connected to the waveform source so that the impressed waveform contains both A. C. and D. C. components. The waveform is reproduced with both A. C. and D. C. components on the cathode of V1 across the resistance R2. The output across R2 is split into two channels. One channel feeds V4 via the integrating network R7, C4. On the grid of V4 therefore appears a potential which is equal to the average voltage $E_{av}$ of the wave plus a constant voltage $E_c$ due to the "no signal" current in V1. With change in the waveform only $E_{av}$ will change.

The second channel is fed to the diode V2 through the condenser C1; thus the D. C. component is removed from the waveform. V2 in conjunction with C1 and R4 forms a D. C. restorer which introduces a D. C. voltage component into the waveform. This D. C. component is equal to the potential difference between the average voltage $E_{av}$ and the positive peak voltage $E_p$. This restored waveform is fed via the integrating network R8, C5 to the grid of V5. So on the grid of V5 there will be a D. C. voltage of the value $E_0+E_{av}-E_p$. $E_0$ is the potential at which the cathode of the diode V2 is maintained by the resistors R6, R13.

The potential across R10 will assume a value proportional to $(E_0+E_{av}-E_p)$ plus a constant voltage $e_1$. The potential across R9 will be proportional with $(E_{av}+E_c)$ which is its grid potential plus a constant voltage $e_2$.

The potential difference P between the cathodes of V5 and V4 will therefore be $$P = K_1(E_{av}+E_c) - K_2(E_0+E_{av}-E_p) + e_2 - e_1$$

where K1 and K2 are constants. If V5 is similar to V4 and the resistances R10 and R9 are equal and high enough in value, then $K_1=K_2=K$ and are very nearly unity. So that the above can be rewritten $$P = K(E_p+E_c-E_0) + e_2 - e_1$$

Now if with the aid of the variable resistance R7, $E_0$ is adjusted in such a way that the potential difference $P=0$ when to the grid of V1 only the black level potential $E_b$ (or any other predetermined voltage) is fed, then $$K(E_b+E_c-E_0)+e_2-e_1=0$$

i. e., $$KE_b = e_1 - e_2 - K(E_c-E_0)$$

So that the measured potential difference $$P = K(E_p-E_b)$$

which is proportional to the black level to peak white potential difference and, of course, the current via R20 and the milliammeter M will be proportional to $(E_p-E_b)$.

C3, C20, C21 and C22 are decoupling condensers, and R3, R21 and R22 are decoupling resistors.

Instead of M and R20 any suitable voltage indicator may be used.

Instead of the simple restoring circuit comprising V2, C1 and R4, it can be replaced of course by the more complex circuit shown in Fig. 2.

I claim:

1. A voltmeter for measuring the peak voltage of an alternating or pulsating waveform with reference to a predetermined D. C. voltage level, comprising an electronic rectifier having an anode and a cathode, a resistor connected between the anode and the cathode of said rectifier, means for feeding the input voltage to said electronic rectifier, a high tension supply, a resistor network connected across said high tension supply, a connection from an intermediate point on said resistor network to the cathode of said rectifier, a pair of measuring devices, each comprising an electronic valve having an anode, a cathode, and at least one grid electrode, a resistor connected in series with the cathode of each of said pair of measuring devices, a condenser connected from the grid of each of said pair of measuring devices to the negative high tension supply line, a resistor connected in series between the anode of each of said pair of measuring devices and the positive high tension supply line, a resistor connected between the anode of said rectifier and the grid of the first of said pair of measuring devices, a D. C. connection for feeding the input voltage to the grid of the second of said pair of measuring devices, and a meter connected between the cathodes of said pair of measuring devices.

2. A voltmeter as claimed in claim 1, wherein the input voltage waveform to be measured is applied to the anode of the electronic rectifier through a cathode follower stage, consisting of an electronic valve having an anode, a cathode and at least one grid electrode, a high tension supply, a resistor connected between the anode of said valve and said positive high tension supply line, a resistor connected between the cathode of said valve and the negative high tension supply line, a D. C. connection for applying the input voltage to the grid of said valve, a condenser connected between the cathode of said valve and the anode of said electronic rectifier and a resistor connecting the cathode of said valve to the grid of the second of said pair of measuring devices.

3. A voltmeter for measuring the peak-to-peak voltage of an alternating waveform comprising a pair of D. C. restorer circuits for restoring the peaks of the alternating waveform to a predetermined D. C. voltage level, means for feeding one peak voltage of said alternating waveform to the first of said D. C. restorer circuits, means for feeding the other peak voltage of said alternating waveform to the second of said D. C. restorer circuits, means for applying a D. C. potential to each of said D. C. restorer circuits, a high tension supply, a pair of measuring devices each comprising an electronic valve having an anode, a cathode and at least one grid electrode, a resistor connected in series with the cathode of each of said pair of measuring devices, a condenser connected from the grid of each of said pair of measuring devices to the negative high tension supply line, a resistor connected in series between the anode of each of said pair of measuring devices and the positive high tension supply line, a D. C. connection for feeding the output from the first D. C. restorer circuit to the grid of the first of said pair of measuring devices, a D. C. connection for feeding the output from the second of said D. C. restorer circuits to the grid of the second of said pair of measuring devices, a common output from the anodes of said measuring devices, and an indicating device connected to the common output of said pair of measuring devices.

4. A voltmeter as claimed in claim 3, wherein the input voltage waveform to be measured is applied to the D. C. restorer circuits through a phase-splitting device, comprising an electronic valve having an anode, a cathode and at least one grid electrode, a resistor connected between the anode of said valve and said positive high tension supply line, a resistor connected between the cathode of said valve and the negative high tension supply line, means for applying the input voltage to the grid of said valve, a condenser connected between the cathode of said valve and the input to the first of said D. C. restorer circuits and a condenser connected between the anode of said valve and the input to the second of said D. C. restorer circuits.

5. A voltmeter as claimed in claim 3, wherein each D. C. restorer circuit comprises an electronic rectifier having an anode and a cathode, a resistor connected between said anode and said cathode, means for applying a D. C. potential to said cathode, a condenser connected between said cathode and a point of fixed potential, a condenser connected to said anode to which the input voltage waveform is fed, and a smoothing circuit connected between said anode and the grid of one of said pair of measuring devices.

6. A voltmeter for measuring the peak-to-peak voltage of an alternating waveform, comprising a phase-splitting device, consisting of an electronic valve having an anode, a cathode and at least one grid electrode, a high tension supply, a resistor connected between the anode of said valve and the positive high tension supply line, a resistor connected between the cathode of said valve and the negative high tension supply line, means for feeding the alternating voltage to the grid of said valve, a pair of electronic rectifiers each having an anode and a cathode, a resistor connected between the anode and cathode of each rectifier, a first condenser connected between the anode of said first rectifier and the cathode of said phase-splitting device, a second condenser connected between the anode of said second rectifier and the anode of said phase-splitting device, a resistor network connected across said high tension supply, means interconnecting the cathodes of said rectifiers together and to an intermediate point on said resistor network, a pair of measuring devices, each comprising an electronic valve having an anode, a cathode and at least one grid electrode, means interconnecting the anodes of said pair of measuring devices, a resistor connected between said anodes and the positive high tension supply line, a resistor connected in series with the cathode of each of said pair of measuring devices and the negative high tension supply line, a condenser connected from the grid of each of said pair of measuring devices to the negative high tension supply line, a resistor connected between the anode of the first of said rectifiers and the grid electrode of the first of said measuring devices, a resistor connected between the anode of the second of said rectifiers and the grid electrode of the second of said pair of measuring devices, a second resistor network connected across said high tension supply and a meter connected between the anodes of said pair of measuring devices and a tapping point on said second resistor network.

7. A voltmeter as claimed in claim 6, wherein at least one of said electronic rectifiers is associated with one or more further electronic rectifiers, the cathodes of all of said rectifiers being connected together at least one resistor interconnecting the anodes of the successive rectifiers, and a condenser connected to the anode of each of said rectifiers to which the input voltage to be measured is fed.

8. A voltmeter for measuring the peak voltage of an alternating or pulsating waveform with reference to a predetermined D. C. voltage level, comprising means for feeding the waveform of which the voltage is to be measured into two channels, an electronic rectifier having an anode and a cathode, a condenser connected to the anode of said rectifier, a resistor connected between the anode and the cathode of said rectifier, means connecting the first of said channels to said condenser, a high tension supply, a resistor network connected across said high tension supply, means connecting the cathode of said rectifier to an intermediate point of fixed potential on said resistor network, a first measuring device comprising an electronic valve having an anode, a cathode and at least one grid electrode, a resistor connected from the cathode of said first measuring device to the negative high tension supply, a condenser connected from the grid of said first measuring device to the negative high tension supply, a D. C. connection including a series resistor connected between the anode of said rectifier and the grid of said first measuring device, for feeding the first channel voltage to the first measuring device, a second measuring device comprising an electronic valve having an anode, a cathode and at least one grid electrode, a resistor connected from the cathode of said second measuring device to the negative high tension supply, a condenser connected from the grid of said second measuring device to the negative high tension supply, at least one resistor connected between the anodes of said two measuring devices and the positive high tension supply, means for producing a reference voltage proportional to the predetermined voltage level from the second channel voltage, said means including a load having one end connected to the negative high tension supply, a D. C. connection including a series resistance connected between the other end of said load and the grid of said second measuring device to apply said reference voltage thereto, and an indicating device connected to be fed with the outputs from said two measuring devices for indicating the voltage to be measured.

9. A voltmeter for measuring the peak voltage of an alternating or pulsating waveform with reference to a predetermined D. C. voltage level, comprising an input coupling valve to which the waveform of which the voltage is to be measured is fed, means for dividing the output voltage from said input coupling valve into two portions, an electronic rectifier having an anode and a cathode, a condenser connected to the anode of said rectifier, a resistor connected between the anode and the cathode of said rectifier, means for feeding one of the output voltage portions from the input coupling valve to said condenser, a high tension supply, a resistor network connected across the said high tension supply, means connecting the cathode of said rectifier to an intermediate point on said resistor network, a condenser connected between the cathode of said rectifier and the negative high tension supply, a first measuring device comprising an electronic valve having an anode, a cathode and at least one grid electrode, a resistor connected from the cathode of said first measuring device to the negative high tension supply, a condenser connected from the grid of said first measuring device to the negative high tension supply, a resistor connected between the anode of said rectifier and the grid of said first measuring device, a second measuring device comprising an electronic valve having an anode, a cathode and at least one grid electrode, a resistor connected from the cathode of said second measuring device to the negative high tension supply, a condenser connected from the grid of said second measuring device to the negative high tension supply, at least one resistor connected between the anodes of said two measuring devices and the positive high tension supply, means for producing a reference voltage proportional to the predetermined voltage level from the second output voltage portion, said means including a load resistor having one end connected to the negative high tension supply, a D. C. connection including a series resistance connected between the other end of said load resistor and the grid of said second measuring device to apply said reference voltage thereto, and an indicating device connected to be fed with the outputs from said two measuring devices for indicating the voltage to be measured.

10. A voltmeter for measuring the peak-to-peak voltage of an alternating or pulsating waveform, comprising a pair of D. C. restorer circuits each consisting of an electronic rectifier having an anode and a cathode, a resistor connected between said anode and said cathode and a condenser connected to the anode of said rectifier, means for feeding one peak voltage of said input waveform to the condenser connected to the anode of the first of said D. C. restorer circuits, means for feeding the other peak voltage of said input waveform to the condenser connected to the second of said D. C. restorer circuits, at least one further rectifier associated with one of said D. C. restorer circuits, the cathodes of all said further rectifiers being connected together, at least one resistor interconnecting the anodes of the successive further rectifiers, and a condenser connected to the anode of each of said further rectifiers to which the input voltage is also fed, a high tension supply, a resistor network connected across said high tension supply, means connecting the cathodes of all of said rectifiers to an intermediate point of said resistor network, a pair of measuring devices, each comprising an electronic valve having an anode, a cathode and at least one grid electrode, a resistor connected from the cathode of each of said measuring devices to the negative high tension supply, a condenser connected from the grid of each of said measuring devices to the negative high tension supply, a resistor connected in series between the first D. C. restorer circuit and the grid of one of said measuring devices, a resistor connected in series between the second D. C. restorer circuit and the grid of the other of said measuring devices, a common anode circuit for said measuring devices and an indicating device connected to the common anode circuit of said measuring devices.

References Cited in the file of this patent

UNITED STATES PATENTS

| Number | Name | Date |
| --- | --- | --- |
| 1,602,882 | Chubb | Oct. 10, 1926 |
| 2,014,102 | Conklin | Sept. 10, 1935 |
| 2,224,199 | Shepard | Dec. 10, 1940 |
| 2,452,880 | Van Beuren | Nov. 2, 1948 |
| 2,540,213 | Paradise et al. | Feb. 6, 1951 |
| 2,576,676 | Elbourn et al. | Nov. 27, 1951 |

FOREIGN PATENTS

| Number | Country | Date |
| --- | --- | --- |
| 565,461 | Great Britain | Nov. 10, 1944 |